(12) United States Patent
Nakajima et al.

(10) Patent No.: US 9,321,114 B2
(45) Date of Patent: *Apr. 26, 2016

(54) WIRE ELECTRIC-DISCHARGE MACHINING DEVICE AND WIRE-ELECTRODE REMOVING DEVICE CONFIGURED TO REMOVE CUT WIRE-ELECTRODE

(75) Inventors: Yoji Nakajima, Chiyoda-ku (JP); Syuichiro Ishihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/363,699

(22) PCT Filed: Jan. 27, 2012

(86) PCT No.: PCT/JP2012/051817
§ 371 (c)(1),
(2), (4) Date: Jun. 6, 2014

(87) PCT Pub. No.: WO2013/111322
PCT Pub. Date: Aug. 1, 2013

(65) Prior Publication Data
US 2014/0319101 A1    Oct. 30, 2014

(51) Int. Cl.
B23H 7/10    (2006.01)

(52) U.S. Cl.
CPC ............... B23H 7/108 (2013.01); B23H 7/102 (2013.01)

(58) Field of Classification Search
CPC ............................... B23H 7/108; B65H 65/00
USPC .............. 219/69.12; 242/472.5, 476.1, 476.2, 242/476.3, 476.4
See application file for complete search history.

(56) References Cited

U.S. PATENT DOCUMENTS 4,034,933 A * 7/1977 Hara et al. ................. 242/129.8
4,483,490 A * 11/1984 Engmann et al. .......... 242/476.1
(Continued)

FOREIGN PATENT DOCUMENTS

JP    63-028517 A    2/1988
JP    63-120034 A    5/1988
(Continued)

OTHER PUBLICATIONS

Office Action for JP 2012-531577 dated Oct. 9, 2012.
(Continued)

*Primary Examiner* — David Angwin
*Assistant Examiner* — John J Norton
(74) *Attorney, Agent, or Firm* — Sughrue Mion, PLLC; Richard C. Turner

(57) ABSTRACT

A wire electric-discharge machining device and wire-electrode removing device are provided. The wire-electric discharge machining device includes a wire-electrode cutting unit that is arranged in a running path of a wire electrode, and a removing unit configured to remove the wire electrode cut by the wire-electrode cutting unit from the running path. The removing unit includes a wire-electrode guide unit that is arranged below the wire-electrode cutting unit and includes a through hole configured to receive a wire-electrode guide pipe and further configured to receive the wire electrode in the running path. The wire-electrode guide unit is configured to guide an end of the wire electrode to a position outside the running path, with the cut wire electrode provided in the through hole, by rotationally moving about a wire-electrode guide shaft.

8 Claims, 7 Drawing Sheets

(56) References Cited

U.S. PATENT DOCUMENTS 4,608,478 A * 8/1986 Aso et al. .................... 219/69.12
5,130,508 A * 7/1992 Umetsu .................... B23H 7/10
                                                              140/139

FOREIGN PATENT DOCUMENTS

| JP | 63-123632 A | 5/1988 |
| JP | 2-167622 A | 6/1990 |
| JP | 02167622 A * | 6/1990 |
| JP | 2-237724 A | 9/1990 |
| JP | 5-305527 A | 11/1993 |
| JP | 2005-096049 A | 4/2005 |

OTHER PUBLICATIONS

International Search Report for PCT/JP2012/051818 dated May 1, 2012.

* cited by examiner

WIRE ELECTRIC-DISCHARGE MACHINING DEVICE AND WIRE-ELECTRODE REMOVING DEVICE CONFIGURED TO REMOVE CUT WIRE-ELECTRODE

CROSS REFERENCE TO RELATED APPLICATIONS

This application is a National Stage of International Application No. PCT/JP2012/051817 filed Jan. 27, 2012, the contents of all of which are incorporated herein by reference in their entirety.

FIELD

The present invention relates to a wire-electrode removing device that removes a wire electrode cut in a wire electric-discharge machining device.

BACKGROUND

A wire electric-discharge machining device generates electric discharge by applying a pulse voltage between a workpiece and a wire electrode laid in a tensioned state between an upper wire guide unit and a lower wire guide unit and machines the workpiece into an arbitrary shape, similar to using a jigsaw, while creating relative motion between the workpiece and the upper and lower wire guide units. During machining by the wire electric-discharge machining device, at the time of a wire electrode connection operation or at the time of processing wire electrode disconnection, the wire electrode needs to be cut and removed. Removal of the wire electrode is performed, for example, according to techniques described in Patent Literatures 1 to 5.

CITATION LIST

Patent Literatures

Patent Literature 1: Japanese Patent Application Laid-open No. 2005-96049
Patent Literature 2: Japanese Patent Application Laid-open No. S63-120034
Patent Literature 3: Japanese Patent Application Laid-open No. S63-123632
Patent Literature 4: Japanese Patent Application Laid-open No. H02-237724
Patent Literature 5: Japanese Patent Application Laid-open No. H02-167622

SUMMARY

Technical Problem

According to Patent Literature 1, a wire electrode cut by a wire-electrode cutting device is clamped by a drive block, and the drive block is horizontally moved to house the wire electrode in a predetermined wire-electrode collection box. However, a wire electrode that can be housed is limited by a horizontal travel distance of the drive block. Therefore, a long wire electrode cannot be removed. If a long wire electrode is left between an upper wire-electrode guide and a lower wire-electrode guide, a wire feed roller needs to be rotated in the opposite direction to a feed direction to rewind the wire electrode to obtain a length that is the same as or shorter than the horizontal travel distance of the drive block, and then the wire electrode needs to be cut by the wire-electrode cutting device to remove the wire electrode. Therefore, the automatic wire connection time becomes long. Furthermore, because a wire electrode to be removed has a substantially linear shape, the wire-electrode collection box corresponding to the length of the substantially linear wire electrode needs to be prepared, and thus work space is wasted.

Patent Literature 2 discloses a wire-electrode removing device that removes a long wire electrode by suction. However, wire electrode diameters that can be used generally in the wire electric-discharge machining device are Ø0.1 to Ø0.3 and accordingly, even if a thin wire electrode (for example, Ø0.1) is to be suctioned, a large suction device that can suction a thick wire electrode (for example, Ø0.3) is required, resulting in excess performance. Further, a wire electrode to be removed has a substantially linear shape and thus a wire-electrode collection box corresponding to the length of the substantially linear wire electrode needs to be prepared, thereby wasting work space.

Patent Literatures 3 and 4 disclose wire-electrode removing devices that feed a wire electrode with the wire electrode put between belts or rollers to remove a long wire electrode. However, even in the case of Patent Literatures 3 and 4, because a wire electrode to be removed has substantially a linear shape, a wire-electrode collection box corresponding to the length needs to be prepared, thereby wasting a work space.

Patent Literature 5 discloses a technique in which at the time of removing a wire electrode, the wire electrode is wound by a fork-like electrode clamping unit to remove a long wire electrode. However, because the wire electrode is clamped by the fork-like electrode clamping unit, if a notch portion of the fork-like electrode clamping unit is formed smaller than a wire electrode diameter, the notch portion cannot be placed at a wire-electrode running position so that the notch portion does not interfere with the wire electrode during electric-discharge machining. Therefore, a travel distance of the fork-like electrode clamping unit needs to be increased, and thus a small cylinder cannot be used. On the other hand, if the fork-like electrode clamping unit is formed larger than the wire electrode diameter to downsize the cylinder, the wire electrode cannot be clamped reliably and cannot be wound. When the wire electrode is to be wound by the fork-like electrode clamping unit, a rotation-position detecting device needs to be attached to a motor to prevent the wire electrode from being unwound and falling from the fork-like electrode clamping unit due to a spring property of the wire electrode or to place the notch portion of the fork-like electrode clamping unit not to be in contact with the wire electrode during electric-discharge machining.

Therefore, a complicated mechanism is required. Furthermore, the wire electrode is pulled up by the fork-like electrode clamping unit in an outer circumferential tangent direction of the fork-like electrode clamping unit, and thus the center of a wire guide is located in the notch portion of the fork-like electrode clamping unit. Therefore, the wire electrode can be wound substantially perpendicularly to the wire guide but cannot be wound exactly perpendicularly thereto, and thus breakage of the wire electrode may occur.

The present invention has been achieved to solve the problems described above, and an object of the present invention is to provide a wire electric-discharge machining device and a wire-electrode removing device that can minimize the possibility of breakage of a wire electrode and reduce the automatic wire connection time. Furthermore, another object of the present invention is to enable removal of a long wire electrode and downsize the wire-electrode collection box to ensure a work space by bringing the removed wire electrode into a small piece.

Solution to Problem

The present invention is directed to a wire electric-discharge machining device that achieves the objects. The wire electric-discharge machining device includes a wire-electrode cutting unit that is arranged in a running path of a wire electrode and cuts the wire electrode; and a removing unit that removes the wire electrode cut by the wire-electrode cutting unit from the running path, wherein the removing unit includes: a wire-electrode guide unit that has a through hole into which the wire electrode in a vertical direction is inserted at the time of electric-discharge machining using the wire electrode, and guides an end on a cut point side of the wire electrode outside the running path, with the cut wire electrode arranged in the through hole, by rotationally moving about a wire-electrode guide shaft in an operation of removal of the wire electrode cut by a wire-electrode cutting unit; a winding shaft unit that winds and removes the wire electrode on the cut point side guided by the wire-electrode guide unit; and a collection member that collects the wound wire electrode.

Advantageous Effects of Invention

According to the present invention, the possibility of breakage of a wire electrode can be minimized and the automatic wire connection time can be reduced. Furthermore, there are remarkable effects such that a long wire electrode can be removed and the wire-electrode collection box can be downsized to ensure a work space by bringing the removed wire electrode into a small piece, which are not achieved by the conventional techniques.

DESCRIPTION OF EMBODIMENTS

Exemplary embodiments of a wire-electrode removing device and a wire electric-discharge machining device according to the present invention will be explained below in detail with reference to the accompanying drawings.

First Embodiment

Figure 1:
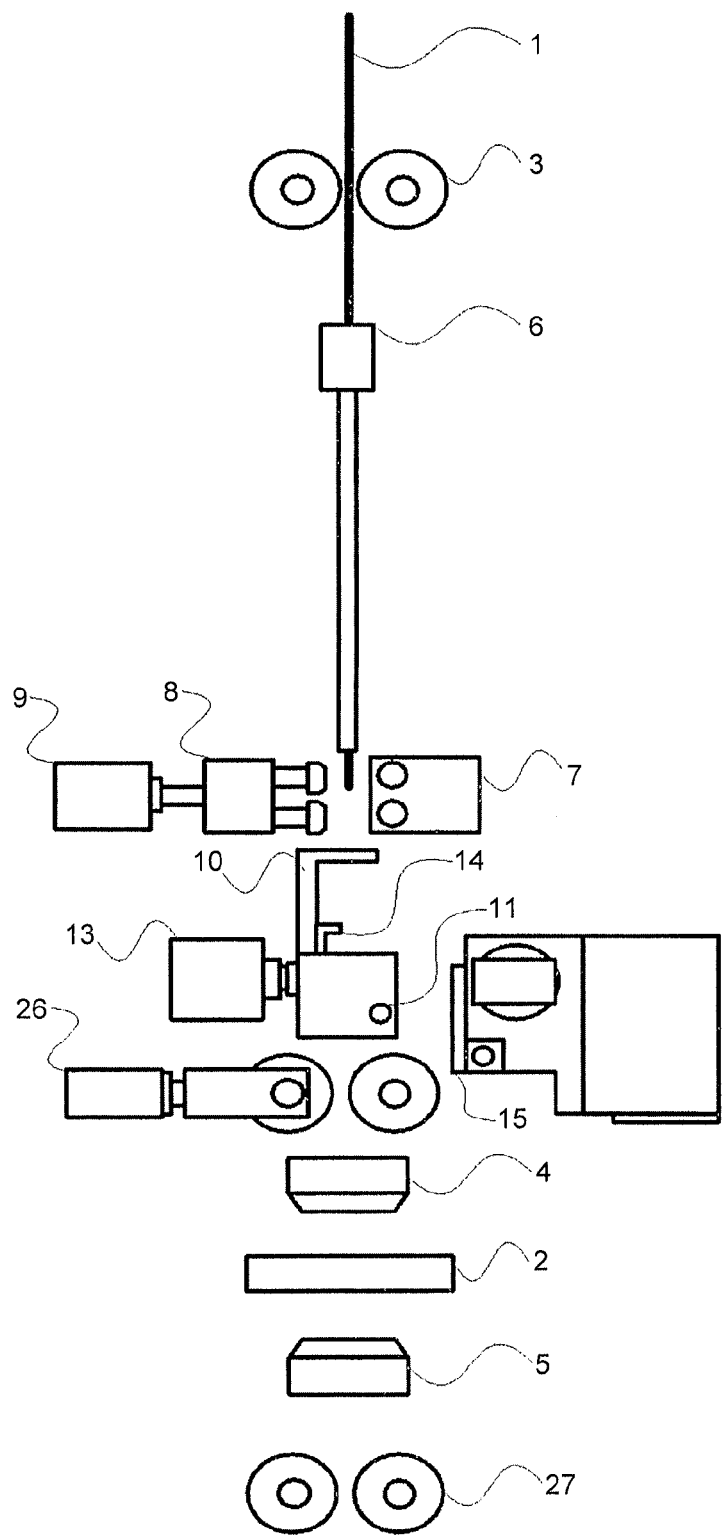
FIG. 1 is an explanatory diagram of an automatic wire connecting device and a wire-electrode removing device in a wire electric-discharge machining device.
Figure 2:
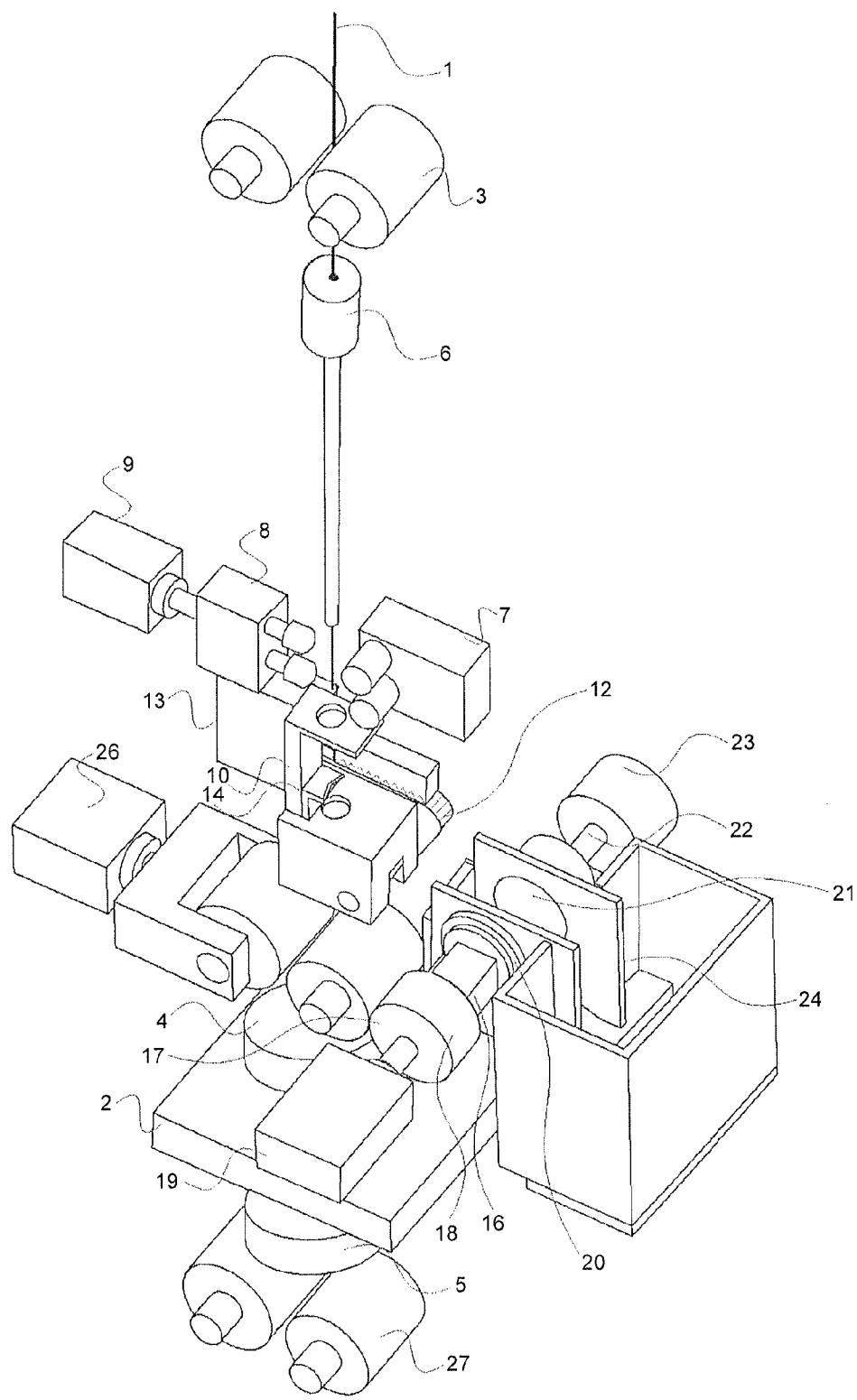
FIG. 2 is a perspective view of a configuration of the wire-electrode removing device.

FIGS. 1 and 2 are explanatory diagrams of an automatic wire connecting device and a wire-electrode removing device in a wire electric-discharge machining device. A wire electrode 1 is fed by rotation of wire-electrode feed rollers 3 and is laid in a tensioned state between an upper wire guide unit 4 and a lower wire guide unit 5, which determine a position of the wire electrode, to generate electric discharge by a pulse voltage applied between the wire electrode 1 and a workpiece 2. The workpiece is machined into an arbitrary shape, similar to using a jigsaw, while creating relative motion between the workpiece 2 and the upper and lower wire guide units 4 and 5. At the time of machining, the wire electrode 1 is automatically connected to wire-electrode collection rollers 27 that collect the wire electrode 1 by an automatic wire connecting device including the wire-electrode feed rollers 3 and a wire-electrode guide pipe 6, passing from the upper wire guide unit 4 through a machining start hole of the workpiece 2.

The wire electrode 1 needs to be cut either when machining is finished, when the wire electrode is disconnected during machining, or when connection by the automatic wire-electrode connecting device fails because the wire electrode 1 is caught by the upper wire-electrode guide 4, the lower wire-electrode guide 5, or the workpiece 2. Accordingly, the wire electric-discharge machining device includes a wire-electrode cutting device that cuts the wire electrode 1 by electric heat by pressing the wire electrode 1 against a current-carrying cutting member 7 using a cut wire-electrode presser 8 in association with an operation of a cutting cylinder 9. The wire electrode cutting method can be, for example, a method of using a blade, instead of using electric heat.

When the wire electrode 1 is disconnected during electric-discharge machining, the wire electrode 1 remaining on a side nearer the collection side than the disconnected point, that is, on the side of the wire-electrode collection rollers 27, is collected by the wire-electrode collection rollers 27 in a wire-electrode traveling direction at the time of performing the wire electric-discharge machining, and is removed. On the other hand, the wire electrode 1 remaining on a side nearer the wire feed side than the disconnected point, that is, between the wire-electrode cutting device and the lower wire-electrode guide 5 or the like needs to be cut by the wire-electrode cutting device and the wire electrode remaining between the wire-electrode cutting device and the lower wire-electrode guide 5 needs to be removed. The cut wire electrode 1 can be removed by a wire-electrode removing device explained in the present embodiment and the wire electrode can be passed through the machining start hole of the workpiece again by the automatic wire-electrode connecting device. Also in a case where connection by the automatic wire-electrode connecting device is not successful at an initial stage of machining as well as the case where the wire electrode 1 is disconnected during electric-discharge machining, the wire electrode needs to be cut so that the cut wire electrode 1 is removed by the wire-electrode removing device in the same manner as described above.

In the wire-electrode removing device, the wire electrode 1 cut by the wire-electrode cutting device is guided to a winding shaft unit by rotation of a wound wire-electrode guide 10 serving as a wire-electrode guide unit arranged at a wire-electrode running position about a wound wire-electrode guide shaft 11. In the winding shaft unit, the wire electrode 1 is clamped between a winding shaft 16 having corner portions and a winding roller 21, the winding roller 21 is rotated to cause the winding shaft 16 to be driven, and the wire electrode 1 is wound on the winding shaft 16, so that the wire electrode 1 is wound perpendicularly to the wire guide and removed. When the wire electrode 1 is to be wound, a load is applied to the wire electrode 1 by pressing the wire electrode 1 with a wound wire-electrode presser upper unit 14 and a wound wire-electrode presser lower unit 15. Therefore, the wire electrode 1 is pressed against the corner portions of the winding shaft 16 to cause plastic deformation of the wire electrode 1, thereby decreasing the spring property of the wire electrode itself. Accordingly, the long wire electrode can be brought into a small piece and removed.

A configuration of the wire-electrode removing device of the present embodiment is explained below in detail. In the drawings, reference sign 10 denotes the wound wire-electrode guide arranged at the wire-electrode running position, which works with a pinion 12 attached to the wound wire-electrode guide shaft 11 with a horizontal movement of a wound wire-electrode guide cylinder 13 with a rack, to rotationally move about the wound wire-electrode guide shaft 11. In the wound wire-electrode guide 10, at the time of non-removal of the wire electrode when the wound wire-electrode guide cylinder 13 with a rack does not move horizontally, a through hole through which the wire-electrode guide pipe 6 passes at the time of automatic connection is formed along a wire-electrode running path, and the wire electrode 1 runs on the running path, thereby performing electric-discharge machining.

The wound wire-electrode guide 10 has a substantially L-shaped member with a notch formed therein, and the notch of the L-shaped portion has a function of guiding the wire electrode 1 to the winding shaft unit by being tilted toward the winding shaft unit at the time of removal of the wire electrode when the wound wire-electrode guide cylinder 13 with a rack moves horizontally. Furthermore, at the time of removal of the wire electrode, the wire electrode 1 is positioned and pressed by the wound wire-electrode presser lower unit 15 provided on the winding shaft unit and the wound wire-electrode presser upper unit 14 of the wound wire-electrode guide 10 formed at a position opposite to the wound wire-electrode presser lower unit 15, and a load is applied at the time of sliding when the wire electrode 1 is to be wound, which will be described later. The wound wire-electrode presser upper unit 14 and the wound wire-electrode presser lower unit 15 are preferably made of a material having a high hardness, for example, a ceramic material to slide the wire electrode 1. However, a rubber material or a resin material that can apply a higher load to the wire electrode can be used. Furthermore, while a V groove is suitable as a shape thereof for positioning, an inclined shape or a circular shape can be used. The wound wire-electrode presser upper unit is attached to the wound wire-electrode guide and is arranged to cooperate with the wound wire-electrode presser lower unit by rotational driving. However, it needless to mention that a cylinder for pressing the wound wire electrode different from a wound wire-electrode guide cylinder can be arranged to press the wire electrode.

A configuration of the wire-electrode removing device on the winding shaft unit side is explained next with reference to FIG. 2. Reference sign 16 denotes the winding shaft in a square shape having corner portions for winding and removing the wire electrode 1 and, for example, suitable for clamping the wire electrode. The winding shaft 16 can effectively press the wire electrode 1 to cause plastic deformation, thereby decreasing the spring property of the wire electrode itself, so long as the winding shaft has corner portions, for example, in a triangular shape, a star shape, or a plate-like shape. Reference sign 17 denotes a winding shaft housing that holds the winding shaft 16 therein, which is fixed to a winding shaft bearing 18 that enables rotation of the winding shaft 17 and can be moved horizontally by a winding shaft cylinder 19 serving as a winding shaft drive unit, together with the winding shaft bearing 18. Reference sign 20 denotes a winding shaft scraper through which the winding shaft 16 passes and that scrapes the wire electrode 1 wound on the winding shaft 16 from the winding shaft 16. Reference sign 21 denotes the winding roller that is arranged at a position facing the winding shaft 16 to clamp the wire electrode 1 in cooperation with the winding shaft 16 and causes the winding shaft 16 to be driven. The winding roller 21 is fixed to a winding roller shaft 22 and rotates by being driven by a winding motor 23. The winding motor 23 can be directly connected to the winding shaft 16 to rotate the winding shaft 16 directly by driving the winding motor 23.

Reference sign 24 denotes a removed wire-electrode guide member that guides the scraped wire electrode 1 to a removed wire-electrode collection box 25. However, an air flow path can be arranged in the removed wire-electrode guide member 24 to blow the scraped wire electrode 1 into the removed wire-electrode collection box 25. Reference sign 26 denotes wire-electrode pressing rollers that are driven at the time of cutting the wire electrode to press the wire electrode 1 to facilitate cutting thereof, and serve as a guide when the wire electrode is pulled out perpendicularly to the lower wire-electrode guide at the time of removal of the wire electrode.

Figure 3:
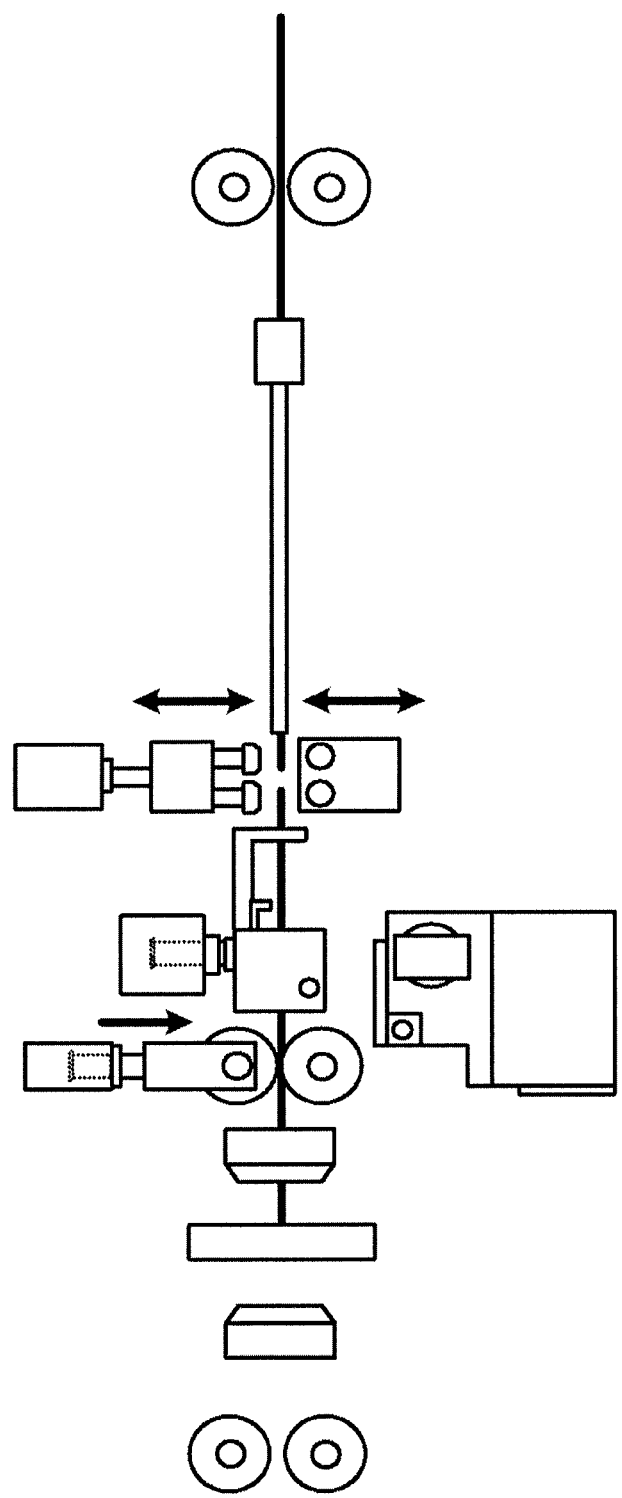
FIG. 3 is an operation explanatory diagram of an operation of the wire-electrode removing device.

An operation of cutting and removing the wire electrode in the wire electric-discharge machining device of the present invention is explained next. When automatic connection of the wire electrode fails or when the wire electrode 1 is disconnected due to the electric-discharge machining, the wire electrode 1 is cut by the wire-electrode cutting device including the current-carrying cutting member 7, the cut wire-electrode presser 8, and the cutting cylinder 9 (see FIG. 3).

Figure 4:
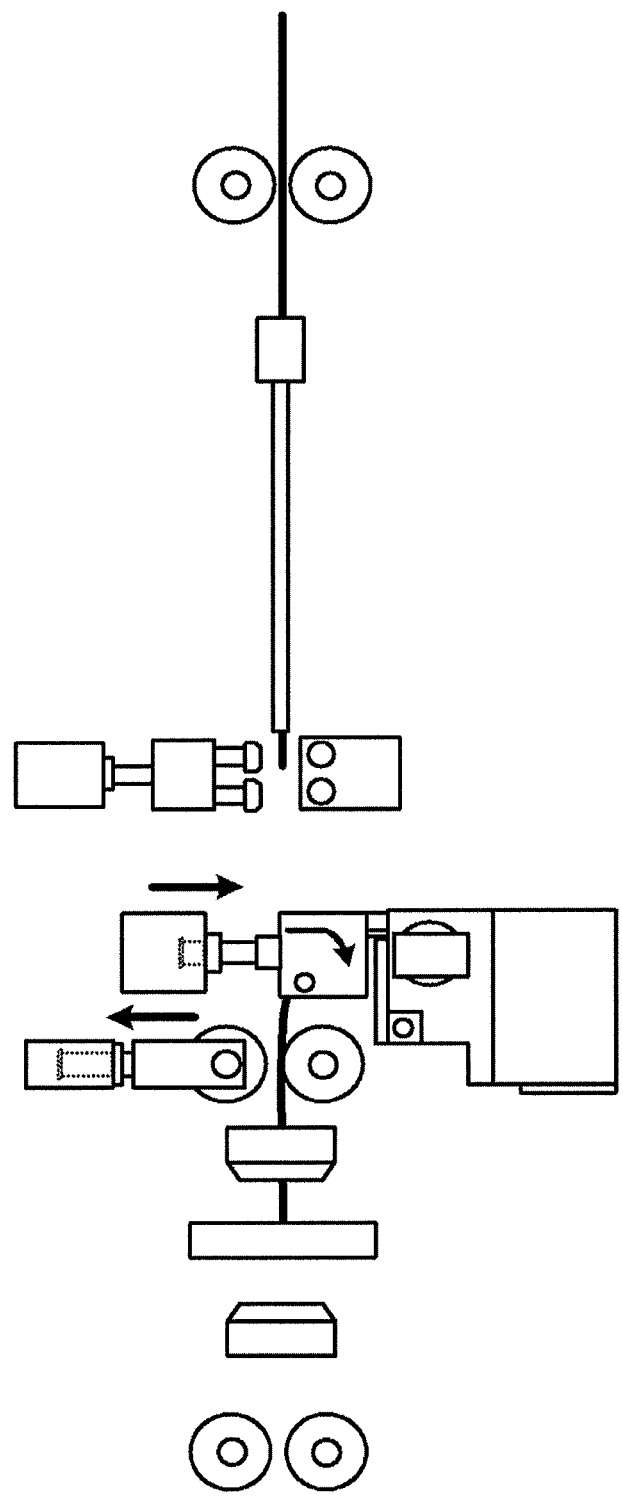
FIG. 4 is an operation explanatory diagram of an operation of the wire-electrode removing device.

An end of the wire electrode 1 cut by the wire-electrode cutting device is in a state of passing through the through hole of the wound wire-electrode guide 10 and being supported. A horizontal movement of the wound wire-electrode guide cylinder 13 with a rack is converted to a rotational movement by the pinion 12, so that the wound wire-electrode guide 10 is rotated by nearly 90 degrees about the wire-electrode guide shaft 11. Accordingly, the end of the cut wire electrode 1 is guided to the winding shaft unit in a state of being sandwiched by the wire-electrode pressing rollers 26 (see FIG. 4).

Figure 5:
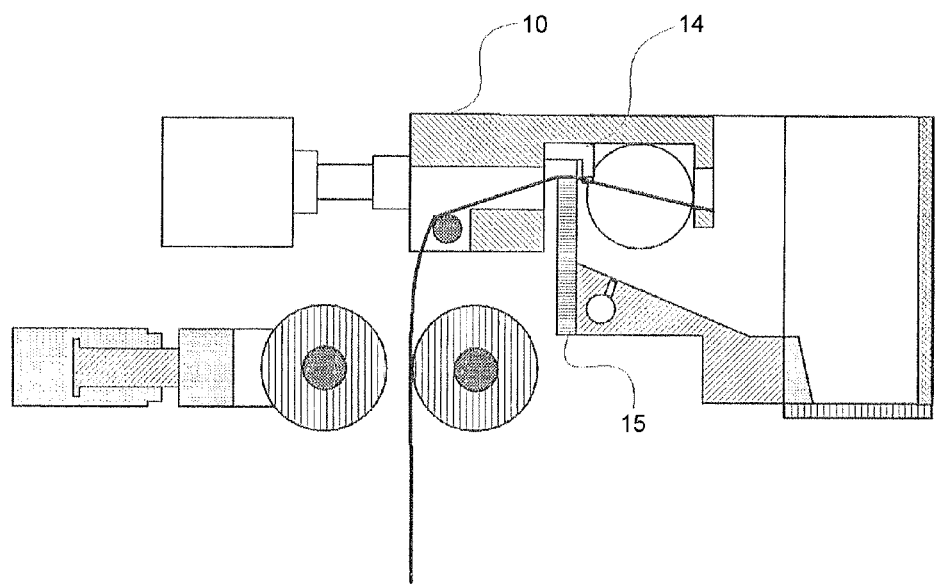
FIG. 5 is an operation explanatory diagram of an operation at a time when a wire electrode is wound and removed.

A sectional view of a state where the wound wire-electrode guide 10 is guided to the winding shaft unit is shown in FIG. 5. As shown in FIG. 5, the wire electrode 1 on the cut end side is supported by the through hole of the wound wire-electrode guide 10 and a clamping point between the wound wire-electrode presser upper unit 14 and the wound wire-electrode presser lower unit 13 on the left side of FIG. 5. The wound wire-electrode presser upper unit 12 and the wound wire-electrode presser lower unit 13 have ideally a V-groove shape because restriction of the winding position on the winding shaft 16 as described later can reduce the spring property of the wire electrode 1 itself more and can bring the wire electrode into a smaller piece.

Figure 6:
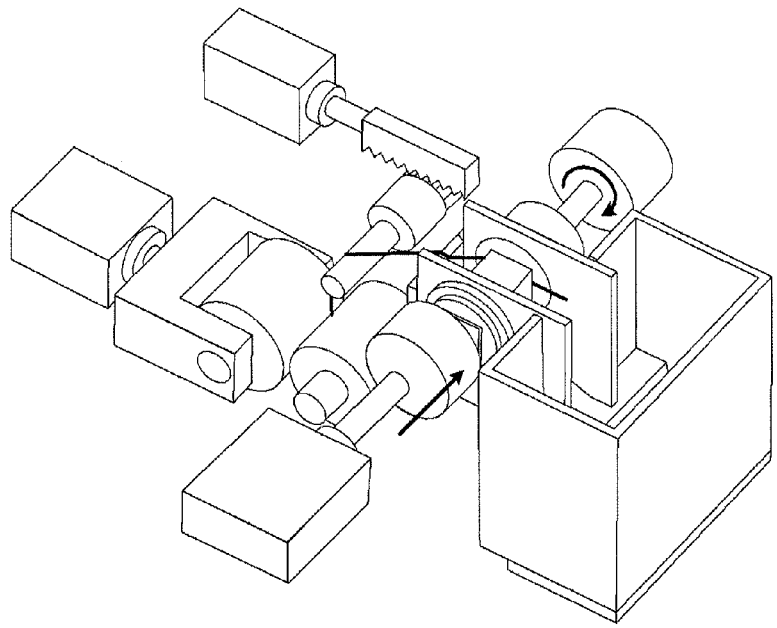
FIG. 6 is an operation explanatory perspective view of an operation of the wire-electrode removing device.

The wire electrode 1 guided to the winding shaft unit is then placed in the notch portion of the wound wire-electrode guide 10, the winding shaft 16 is horizontally driven by the winding shaft cylinder 19 so that the winding shaft 16 is inserted into the notch portion, and the wire electrode 1 is clamped between the winding shaft 16 and the winding roller 21 arranged at a position facing the end face of the winding shaft 16 (see FIG. 6).

After sandwiching by the wire-electrode pressing rollers 26 is released, the winding motor 23 attached to the winding roller shaft 22 is rotationally driven in the state with the wire electrode 1 being clamped, to rotate the winding roller 21 and thus the winding shaft 16 is driven. As a result, the wire electrode 1 to be removed is wound on the winding shaft 16.

Figure 7:
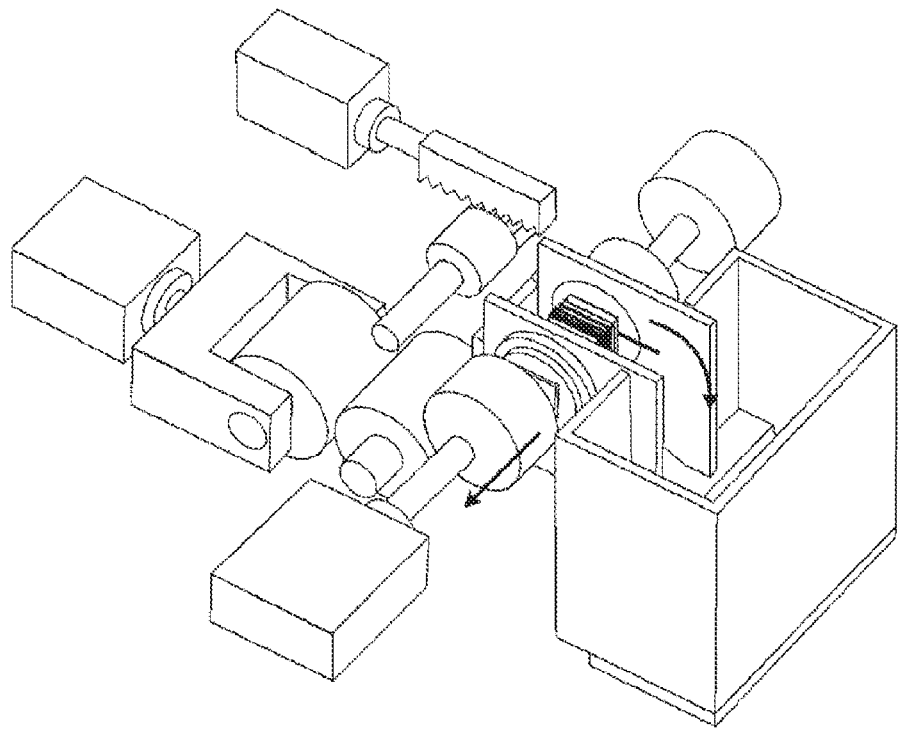
FIG. 7 is an operation explanatory perspective view of an operation of the wire-electrode removing device.
Figure 8:
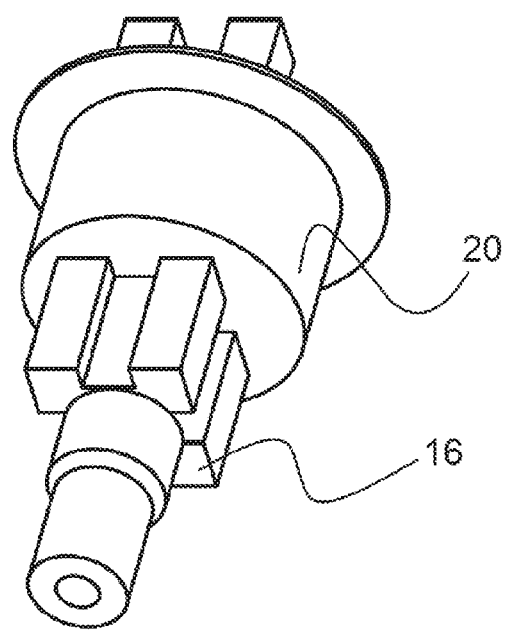
FIG. 8 is a configuration diagram of a configuration of a winding shaft and a winding shaft scraper.

Accordingly, even a long wire electrode can be wound. At this time, because the wire electrode 1 is sandwiched between the wound wire-electrode presser upper unit 12 and the wound wire-electrode presser lower unit 13, the wire electrode 1 can be wound effectively on the winding shaft 16 by applying a sufficient load to the wire electrode 1 to cause plastic deformation by the winding shaft 16 having the corner portions. The wound wire electrode 1 is brought into a small piece due to the plastic deformation (see FIG. 7). When the wire electrode 1 is wound on the winding shaft 16, the wire electrode 1 can be brought into a smaller piece if the diameter of the winding shaft 16 is decreased. Furthermore, when the winding shaft 16 and the winding shaft scraper 20 are formed in concave polygonal shapes having concave and convex portions as shown in FIG. 8, and the winding shaft 16 is arranged to fit to the winding shaft scraper 20, the wire electrode 1 wound on the winding shaft 16 can be scraped more reliably.

After the wound wire-electrode guide 10 is returned to the original position, the winding shaft 16 is horizontally moved by the winding shaft cylinder 19 so that the wire electrode 1 wound on the winding shaft 16 is scraped from the winding shaft 16 by the winding shaft scraper 20. The removed wire electrode 1 is guided to the removed wire-electrode collection box 25 by the removed wire-electrode guide member 24. An air flow path can be arranged in the removed wire-electrode guide member 24 to guide the removed wire electrode 1 to the removed wire-electrode collection box 25 and the scraped wire electrode 1 can be blown into the removed wire-electrode collection box 25.

According to the present embodiment, the scraped wire electrode is brought into a small piece, and thus the removed wire-electrode collection box 25 can be downsized. Furthermore, the position of the wire electrode 1 remains unchanged from the wire running position because of the wire-electrode pressing rollers 26, and the wire electrode can be wound perpendicularly to an upper unit of the upper wire guide, thereby enabling to prevent disconnection of the wire electrode being wound. It has been explained that the winding shaft 16 is driven and moved horizontally to press, fix, and release the wire electrode. However, the driving direction is not limited to the horizontal direction, and the winding shaft 16 can be driven, for example, vertically in the present embodiment. Any mechanism can be applied to the present embodiment so long as the mechanism can press, release, and rotate the wire electrode appropriately.

Second Embodiment

In the first embodiment, when the cut wire electrode 1 is to be wound on the winding shaft 16, the wire electrode 1 is sandwiched between the wound wire-electrode presser upper unit 14 and the wound wire-electrode presser lower unit 15 and wound on the winding shaft 16 with a load applied to the wire electrode 1. At this time, by enabling air pressure to the wound wire-electrode guide cylinder 13 with a rack to vary depending on the diameter of the wire electrode 1 so that the load can be adjusted and by adjusting the load between the wound wire-electrode presser upper unit 14 and the wound wire-electrode presser lower unit 15 depending on the diameter of the wire electrode 1, disconnection at the time of winding can be also prevented and the way of bringing the wound wire electrode 1 into a small piece can be also adjusted. The same effect can be obtained also by sandwiching the wire electrode 1 with the wire-electrode pressing rollers 26, applying a load to the wire electrode 1, and adjusting the load at the time of winding.

Third Embodiment

Figure 9:
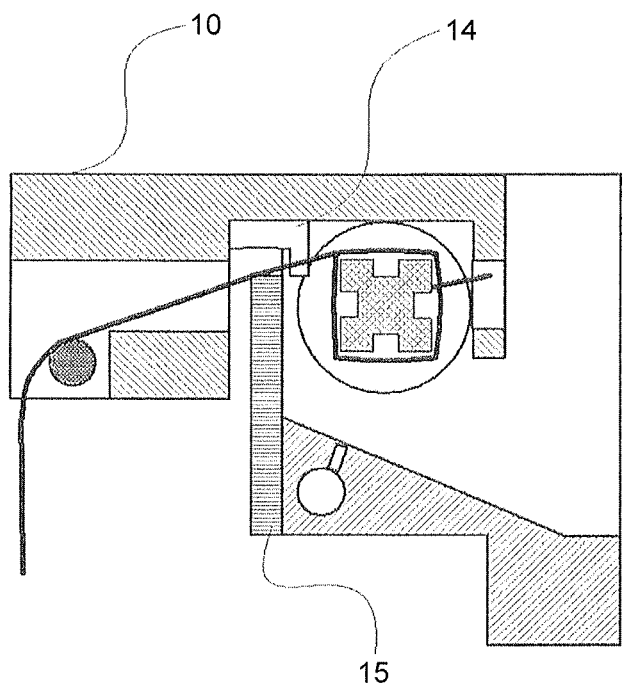
FIG. 9 depicts a configuration of a wound wire-electrode guide.

FIG. 9 is an enlarged view of relevant parts of the wound wire-electrode presser upper unit 14 and the winding shaft 16. In a third embodiment of the present invention, concave portions as shown in FIG. 8 are provided in the winding shaft 16, and at the time of winding the cut wire electrode 1 on the winding shaft 16, when the wire electrode 1 is wound while being sandwiched between the wound wire-electrode presser upper unit 14 and the winding shaft 16, the wire electrode 1 can be wound while being bent at the corner portions of the winding shaft 16. As in the second embodiment, by enabling air pressure to the wound wire-electrode guide cylinder 13 with a rack to vary so that the load can be adjusted and adjusting the load depending on the diameter of the wire electrode 1, the way of bringing the wound wire electrode 1 into a small piece can be adjusted.

Industrial Applicability

The present invention relates to a wire electric-discharge machining device including a wire-electrode removing device and can remove a long wire electrode, reduces an automatic wire connection time, minimizes possibility of breakage of a wire electrode, and brings the removed wire electrode into a small piece, so that a wire-electrode collection box can be downsized to ensure a work space.

The invention claimed is:

1. A wire electric-discharge machining device comprising:
    a wire-electrode cutting unit that is arranged in a running path of a wire electrode, the wire-electrode cutting unit being configured to cut the wire electrode; and
    a removing unit configured to remove the wire electrode cut by the wire-electrode cutting unit from the running path,
    wherein the removing unit includes:
        a wire-electrode guide unit that is arranged below the wire-electrode cutting unit in the running path of the wire electrode, the wire-electrode guide unit comprising a through hole configured to receive a wire-electrode guide pipe during a wire connection operation to connect the electrode wire to rollers and further configured to receive the wire electrode in the running path when electric-discharge machining using the wire electrode, the wire-electrode guide unit being configured to guide an end of the wire electrode, formed by a cutting operation of the wire-electrode cutting unit, to a position outside the running path, with the cut wire electrode provided in the through hole, by rotationally moving about a wire-electrode guide shaft when removing the wire electrode cut by the wire-electrode cutting unit;
        a winding shaft unit configured to wind and remove the cut wire electrode guided by the wire-electrode guide; and
        a collection member that collects the wound and removed wire electrode.

2. The wire electric-discharge machining device according to claim 1, wherein the wire-electrode guide unit is configured to rotationally move about the wire-electrode guide shaft according to a horizontal movement of a wound wire-electrode guide cylinder connected to a rack that is coupled with the wire-electrode guide shaft.

3. The wire electric-discharge machining device according to claim 1, wherein the wire-electrode guide unit has a substantially L-shaped member with a notch portion formed therein, the notch portion being configured to receive the wire electrode such that the wire electrode is wound and removed by the winding shaft unit inserted in the notch portion of the substantially L-shaped member when removing the wire electrode.

4. The wire electric-discharge machining device according to claim 3, further comprising:
- a wound wire-electrode presser upper unit provided in the wire electrode guide unit; and
- a wound wire-electrode presser lower unit provided on the winding shaft unit,
- wherein the wound wire-electrode presser upper unit and the wound wire-electrode presser lower unit are configured to sandwich the wire electrode according to a rotational movement of the wire-electrode guide unit, and the winding shaft unit is configured to apply a load sufficient to cause plastic deformation of the wire electrode when winding the wire electrode.

5. The wire electric-discharge machining device according to claim 1, wherein the winding shaft unit comprises:
- a winding shaft configured to press and fix, at an end face thereof, the wire electrode guided by the wire-electrode guide unit, the winding shaft having a columnar shape having corner portions, the winding shaft configured to wind the wire electrode around the winding shaft according to a rotational driving force;
- a winding-shaft drive unit configured to supply the rotational driving force to drive the winding shaft to press and fix the wire electrode or release the pressing of the wire electrode; and
- a scraper member configured to remove the wound wire electrode from the winding shaft when releasing the pressing of the winding shaft by the winding-shaft drive unit.

6. The wire electric-discharge machining device according to claim 1, further comprising wire-electrode pressing rollers arranged below the wire-electrode guide unit, the wire-electrode pressing rollers being configured to hold the wire electrode when guiding the end of the cut wire electrode outside the running path by the wire-electrode guide unit.

7. The wire electric-discharge machining device according to claim 1, wherein the winding shaft unit comprises a winding shaft having a columnar shape having a cross section of a concave polygonal shape.

8. A wire-electrode removing device provided in a wire electric-discharge machining device and configured to remove a cut wire electrode, the wire-electrode removing device comprising:
- a wire-electrode guide unit that is arranged below a wire-electrode cutting unit, the wire-electrode cutting unit being arranged in a running path of the wire electrode and included in the wire electric-discharge machining device, the wire-electrode removing device being a physically distinct component from the wire-electrode cutting unit, the wire-electrode guide unit comprising a through hole configured to receive a wire-electrode guide pipe during a wire connection operation to connect the electrode wire to rollers and further configured to receive the wire electrode in the running path when electric-discharge machining using the wire electrode, the wire-electrode guide unit being configured to guide an end of the wire electrode, formed by a cutting operation of the wire-electrode cutting unit, to a position outside the running path, with the cut wire electrode provided in the through hole, by rotationally moving about a wire-electrode guide shaft when removing the wire electrode cut by the wire-electrode cutting unit;
- a winding shaft unit configured to wind and remove the cut wire electrode guided by the wire-electrode guide unit; and
- a collection member that collects the wound and removed wire electrode.

* * * * *